Patented Oct. 17, 1933

1,931,182

UNITED STATES PATENT OFFICE 1,931,182

CLUTCH

Emile Dombret, Courbevoie, France

Application November 5, 1931, Serial No. 573,185, and in France March 23, 1931

6 Claims. (Cl. 192—68)

My invention has for its object various improvements in clutches. One of said improvements consists in eliminating the axes of articulation of the levers. This arrangement facilitates the construction of the clutch device and does away with a cause of much wear and tear.

In the device according to my invention the disc to be driven is placed, in the well known manner, between a fly wheel (or driving disc) and a movable plate, said movable plate and said disc being drawn towards each other through the action of powerful springs.

The releasing of the clutch is insured by means of a sliding ring in which are mounted, without the interposition of axes of revolution, a plurality of levers bearing on the driving fly wheel, also without the intermediary of axes of articulation, so as to force back the movable plate.

Preferred embodiments of my invention will be hereinafter described with reference to the accompanying drawings given merely by way of example and in which.

Figure 1:
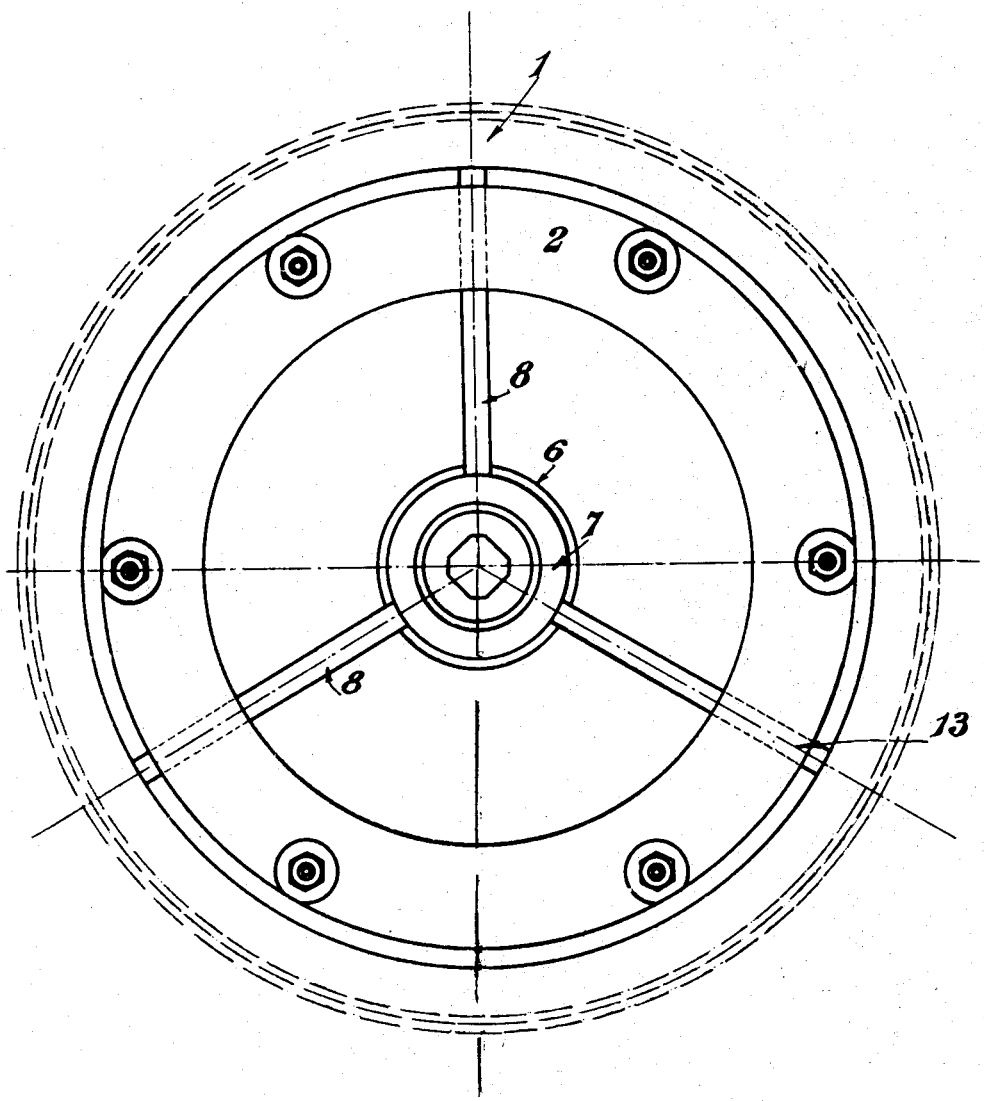
Fig. 1 is a side elevation view of my device.
Figure 2:
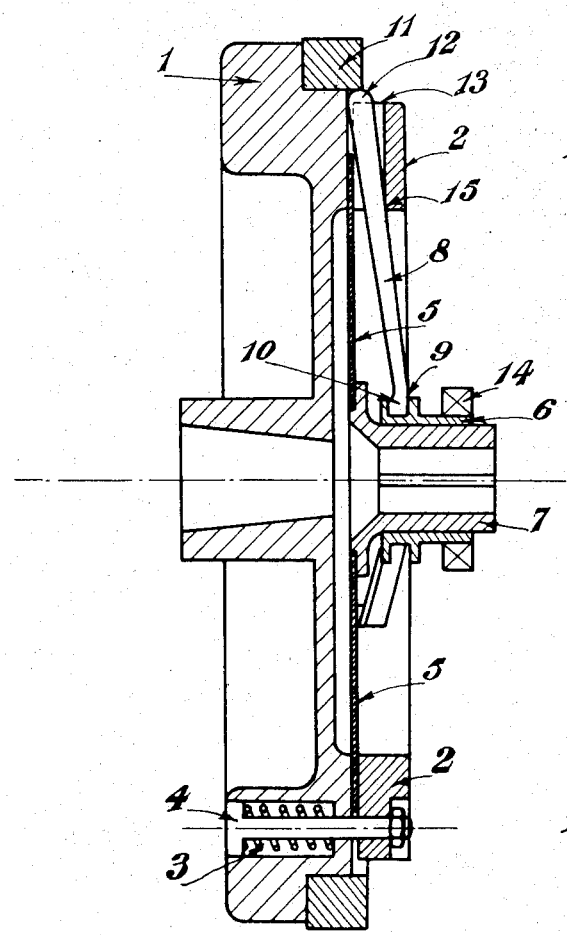
Fig. 2 is a cross section view of an embodiment of my invention.

The clutch according to my invention comprises a disc or driving wheel 1 and a movable plate 2 drawn towards disc 1 through springs 3 acting on rods 4. The usual driven disc 5, made of a material having appropriate elasticity and a suitable coefficient of friction, is placed between disc 1 and plate 2.

The disengagement of the clutch is insured, according to the well known method, by means of a sleeve 6 sliding about the hub 7 of disc 5 and acting upon levers 8, which force back plate 2 by fulcruming on flywheel 1.

The chief characteristic of my invention consists in that levers 8 are not jointed to the fly wheel 1 nor to sleeve 6. Said levers 8 are connected to sleeve 6 by means of a groove 9, in which heads 10 of levers 8 penetrate. On the other hand, levers 8 are connected to fly wheel 1 by means of a ledge or crown 11, against which butt the outside extremities 12 of levers 8. Furthermore, in order to avoid displacing levers 8 in a direction at right angles to the radii, movable plate 2 is provided with slots or recesses 13, in which said levers are guided. It is therefore evident that this method of mounting the clutch insures the keeping in place of levers 8. When thrust bearing 14 is displaced, sleeve 6 slides along hub 7, and levers 8, pivoting at point 10, are forced into the angle formed by ring 11 and the rear portion of fly wheel 1, part 15 of said levers 8 acts in a backward direction upon the bottom part of slots 13 of plate 2, thus performing the unclutching operation.

Figure 3:
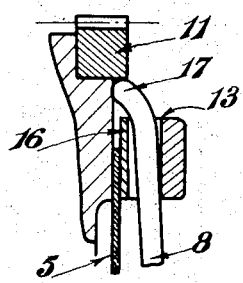
Fig. 3 shows another embodiment of my invention.

If, for any reason, it should be desirable to avoid direct contact between disc 5 and grooves 13, such a contact being liable to deform or wear out, in certain cases, said disc 5, an auxiliary plate 16 (Fig. 3), or any similar device, may be provided to cover slots 13 and thus afford disc 5 a plane surface.

Figure 4:
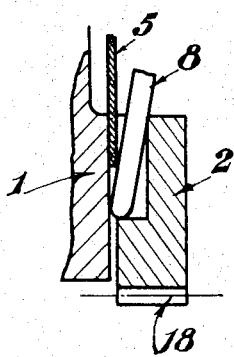
Fig. 4 shows still another embodiment.

Another embodiment of my invention is shown in Fig. 4 and consists in employing mobile plate 2 as a starting device, when the engine comprises one. Plate 2 is then provided with teeth 18 meshing with the pinion of the starting device.

Of course, plate 2 may be arranged in that manner with any mode of mounting levers 8.

While I have disclosed what I deem to be preferred embodiments of my invention, I do not wish to be limited thereto, as there might be changes made in the construction, disposition and form of the parts without departing from the principle of my invention as comprehended within the scope of the appended claims.

What I claim is:

1. A clutch comprising in combination, a driving disc, a plate adapted to rotate together therewith and adapted to be moved axially with respect thereto, a driven disc interposed between said disc and said plate, elastic means for pressing said first mentioned disc and said plate towards one another, a sleeve provided with a circular groove adapted to slide axially with respect to said two discs, a plurality of radially disposed levers having their outer ends applied against the first mentioned disc and their inner ends lying in said groove, said plate being provided with a plurality of radial notches adapted to receive said levers for maintaining them in radial planes, whereby an axial displacement of said sleeve away from said discs will cause said plate to be separated from said disc.

2. A clutch comprising in combination, a flywheel, a rim projecting from the lateral face of said fly-wheel, an annular plate adapted to rotate together with said fly-wheel and adapted to be moved axially with respect thereto, a disc interposed between said plate and said fly-wheel, a spring for pressing said plate towards said fly-wheel, a hub on said disc, a sleeve adapted to slide axially along said hub, a collar on said sleeve, a plurality of radially disposed levers having their outer ends applied against the lateral face of the fly-wheel close to the rim projecting therefrom and their inner ends lying in said collar, said plate being provided with a plurality of radial notches adapted to receive said levers respectively, for maintaining them in radial planes, whereby an axial displacement of said sleeve away from the fly-wheel will cause the plate to be separated from said fly-wheel, thus releasing the driven disc.

3. A clutch comprising in combination, a fly-wheel, a rim projecting from the lateral face of said fly-wheel, an annular plate coaxial therewith and adapted to be moved axially with respect to said fly-wheel, said plate being provided with a plurality of radial notches, a disc interposed between said plate and said fly-wheel, a spring for pressing said plate towards said fly-wheel, a hub on said disc, a sleeve adapted to slide axially along said hub, a collar on said sleeve, a plurality of radially disposed levers having their outer ends applied against the lateral face of the fly-wheel, close to the rim projecting therefrom, and their inner ends lying in said collar, said levers extending freely through said notches, a second annular plate interposed between the first plate and the disc so as to cover the notches, whereby an axial displacement of said sleeve away from the fly-wheel will cause the plate to be separated from said fly-wheel, thus releasing the driven disc.

4. A clutch according to claim 1, in which said plate is toothed on its outer periphery so as to be adapted to cooperate with the starter pinion.

5. A clutch according to claim 2, in which said plate is toothed on its outer periphery so as to be adapted to cooperate with the starter pinion.

6. In an automobile vehicle including a starter pinion, a clutch comprising in combination, a driving disc, a plate coaxial therewith and adapted to be moved axially with respect to said disc, a driven disc interposed between said disc and said plate, elastic means for pressing said first mentioned disc and said plate towards each other, a plurality of movable levers interposed between the first mentioned disc and the plate whereby the plate can be moved away from said first mentioned disc, means for operating said levers, and a plurality of teeth provided along the periphery of the plate and adapted to cooperate with the starter pinion.

EMILE DOMBRET.